April 15, 1958 D. T. LANG 2,831,091
TEMPERATURE SENSING DEVICE
Filed July 5, 1955 3 Sheets-Sheet 2
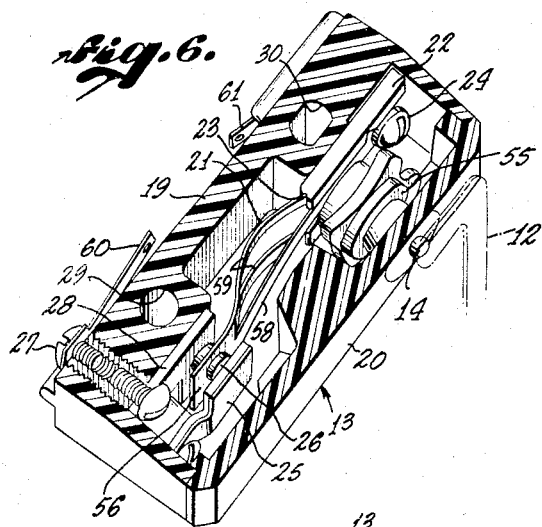
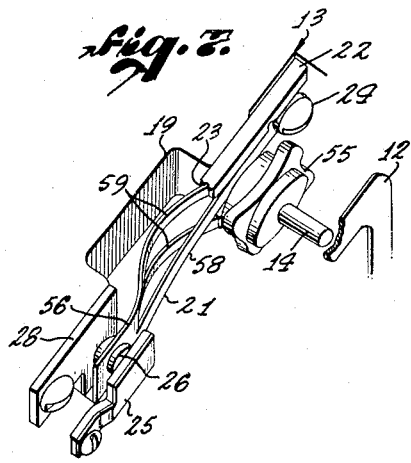
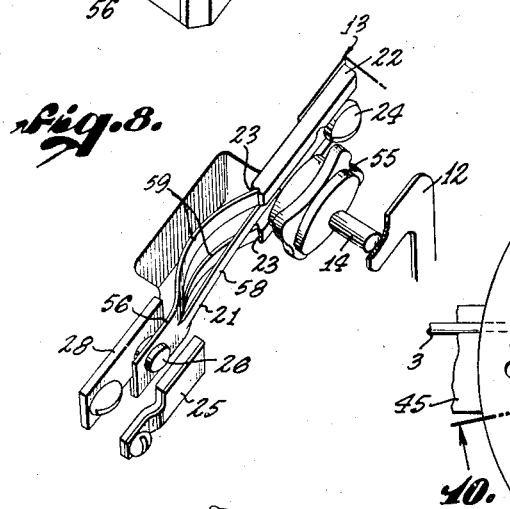
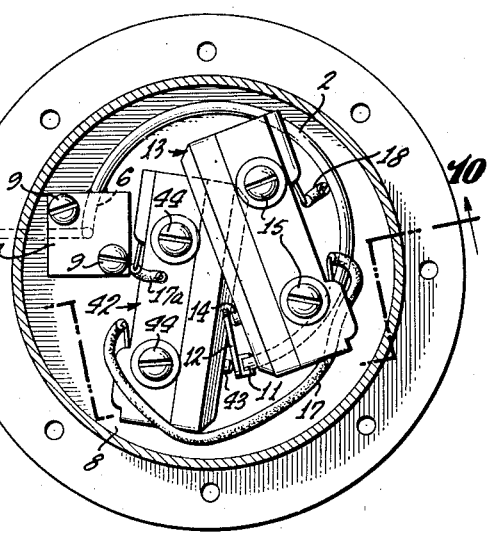
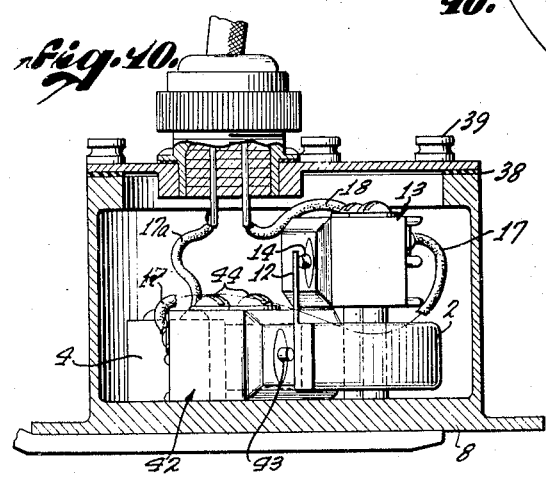
DELMER T. LANG,
INVENTOR.
BY
ATTORNEY.

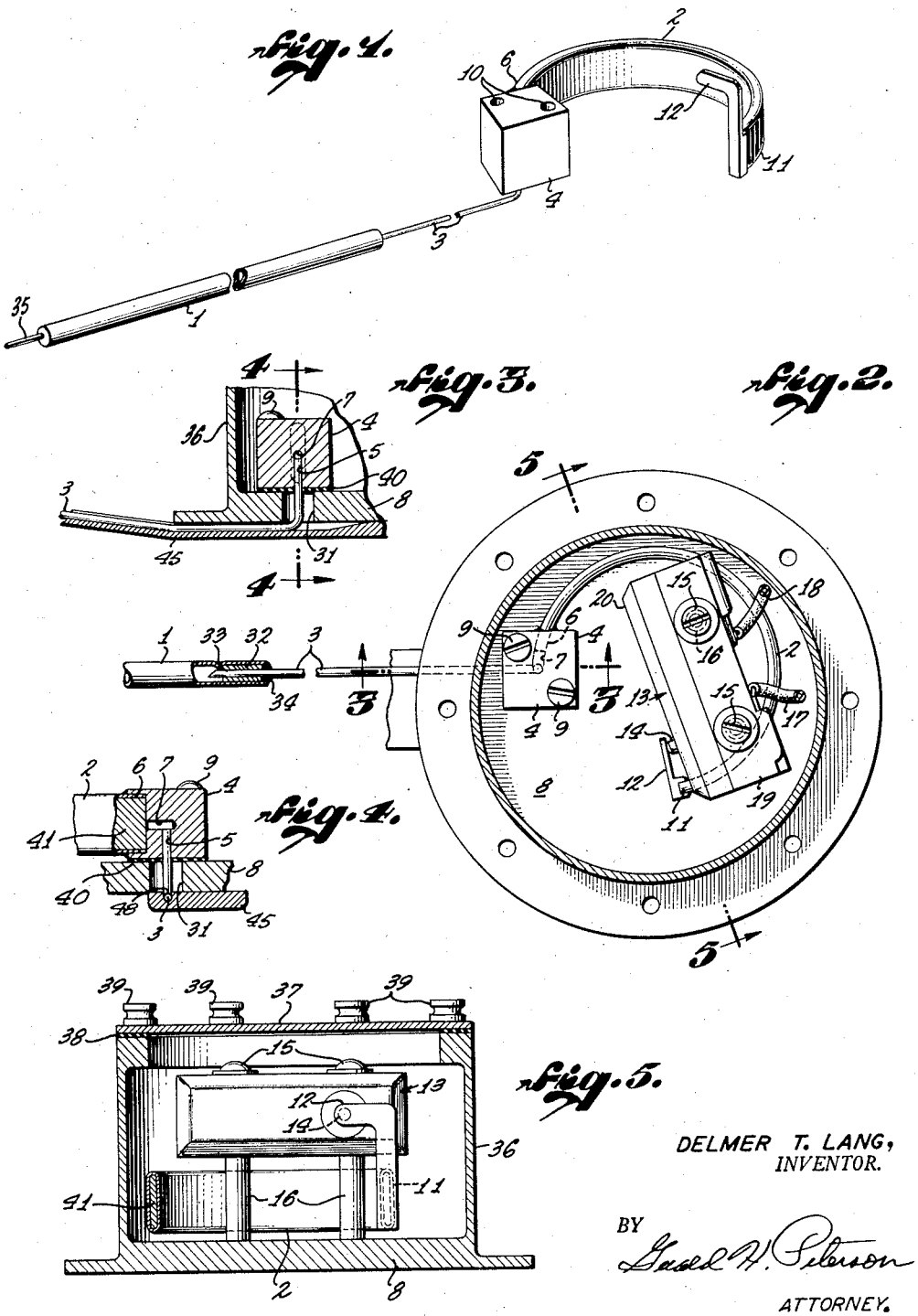

April 15, 1958 D. T. LANG 2,831,091
TEMPERATURE SENSING DEVICE
Filed July 5, 1955 3 Sheets-Sheet 3
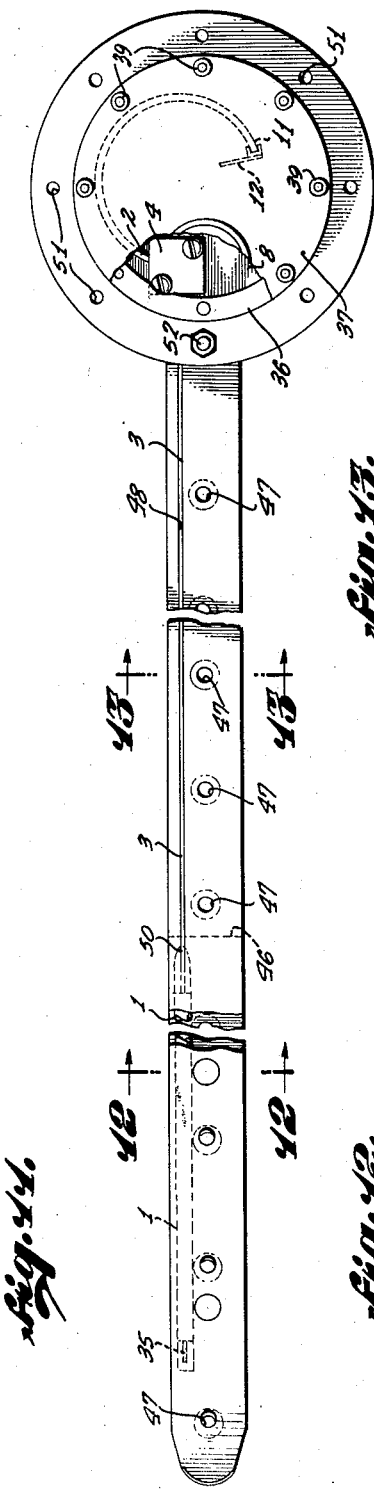
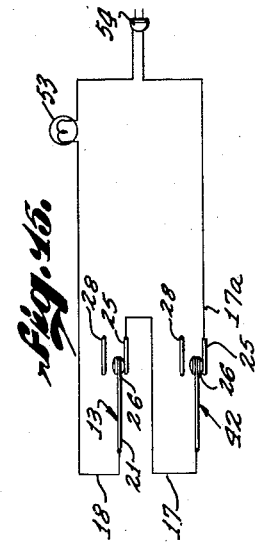
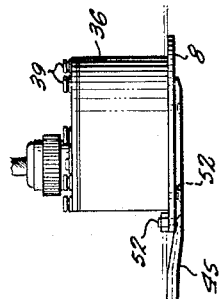
DELMER T. LANG,
INVENTOR.
BY
*Gerald H. Peterson*
ATTORNEY.

United States Patent Office 2,831,091
Patented Apr. 15, 1958

2,831,091

TEMPERATURE SENSING DEVICE

Delmer T. Lang, Palos Verdes Estates, Calif., assignor to Walter Kidde-Pacific, Van Nuys, Calif., a corporation of California Application July 5, 1955, Serial No. 519,756

26 Claims. (Cl. 200—140)

This invention relates to a temperature responsive device and particularly a thermostat useful for aircraft.

Many temperature indicating devices, thermostats, and temperature regulating devices are known for a variety of uses, but none are available capable of satisfactorily meeting a combination of important specification requirements for aircraft use.

To illustrate, a thermostat for controlling the wing de-icing heaters of an airplane should have a temperature sensitive or responsive element capable of following closely the temperature of the wing skin. It should be sufficiently sensitive to operate to turn the heater on or off and maintain the temperature range at the desired temperature level. It should be satisfactorily operable over a wide temperature range, such as —90° F. to 200° F., and be unaffected by wide changes in altitude, such as from 1,000 feet below sea level to 50,000 feet above. It should be relatively unaffected by shock or vibration. In many aircraft uses it is desirable that the thermostatic control device turn off the heater if the confined fluid should leak out. Such a control is said to be fail-safe. Also, in some applications its is desirable to have the thermostat turn off the heater at a temperature lower than the usual operating temperature when the whole airplane is warm and is at a temperature just a little below the operating temperature. For example, if the airplane having the thermostat set for operating at about 165° F. is at a desert temperature of 140° F., it is desirable that the thermostat operate to open the heater switch at about 140° F. so that no heating will be applied when the airplane is at such an elevated temperature. In addition, such a thermostat should be capable of economical manufacture in mass production and be simple and durable to assure satisfactory operation under all conditions of use for a long period of time. Thus, it will be seen that such uses as here referred to on aircraft place an unusual combination of stringent requirements on the thermostat, and such a thermostat was not available in the art prior to my invention.

In accordance with my invention I have discovered a temperature responsive device or thermostat capable of meeting such a combination of stringent requirements and therefore satisfactory for such aircraft use. Moreover, because of its surprising capabilities, my new thermostat has many other uses as will be apparent to those skilled in the art.

Accordingly, it is a general object of my invention to provide a temperature responsive device or thermostat which will satisfactorily meet such a combination of stringent requirements as referred to above.

It is another object of my invention to provide a temperature responsive device or thermostat which will positively operate an electrical switch without arcing.

It is another object of my invention to provide a temperature indicating device or thermostat responsive to a hot spot of highest temperature of the bulb thereof.

It is another object of my invention to provide a temperature responsive device or thermostat of a type which has the desired sensitivity at the operating temperature.

It is an object of my invention to povide a thermostat which is unaffected in its desired operations by large changes in altitude.

It is still another object of my invention to provide a thermostat which is unaffected in its desired operations when subjected to shock or vibration.

It is another object of my invention to provide a thermostat with a Bourdon tube and a bulb in which the operation is relatively insensitive to changes of temperature of said Bourdon tube and sensitive substantially only to changes in temperature of the bulb.

It is a still further object of my invention to provide a thermostat the operating temperature of which will drop somewhat with an increase in temperature thereof.

It is another object of my invention to provide a thermostat, the temperature responsive element of which can be so installed with respect to the object whose temperature is to be controlled, such as the wing skin of an airplane, to closely follow the temperature thereof.

It is another object of my invention to provide a thermostat which is capable of satisfactorily performing its desired functions over a wide temperature range.

It is still a further object of my invention to provide a thermostat which is fail-safe and still further to provide such a thermostat which is not only fail-safe at extremely low temperatures but also has the desired sensitivity at an elevated temperature of operation.

It is another object of my invention to provide a thermostat having a confined fluid exerting enough pressure at extremely low temperatures to assure operation of the fail-safe feature and also being satisfactorily sensitive at an elevated operating temperature.

Further additional objects and advantages of my invention will be apparent to those skilled in the art to which my invention relates from the following description taken in conjunction with the accompanying drawings.

By way of example, my invention will be described specifically as embodied in a thermostat suitable for controlling de-icing heaters of an airplane. It will be apparent that such a specific disclosure of my invention will afford adequate guidance for those skilled in the art to which my invention pertains to apply my invention to other temperature controlling or indicating purposes.

In the drawings which are to be regarded as illustrating my invention by setting out a specific embodiment thereof:

Fig. 1 is a perspective view of the fluid-containing means of the thermostat of my invention showing both the temperature-sensing or bulb portion and the fluid pressure responsive means or Bourdon tube;

Fig. 2 shows the arrangement of Fig. 1 with the Bourdon tube operatively mounted on the same base with a snap switch so that changes in the fluid pressure of the confined fluid in the bulb and Bourdon tube will operate the snap switch;

Fig. 3 is a sectional view taken on the line 3—3 of Fig. 2 showing the detail arrangement for connecting the bulb in communication with the Bourdon tube;

Fig. 4 is a sectional view taken on line 4—4 of Fig. 3;

Fig. 5 is a sectional view of the housing and base for the Bourdon tube and snap switch taken on line 5—5 of Fig. 2;

Fig. 6 is a perspective view of the snap switch with switch housing and mount shown in relation with the operating finger of the Bourdon tube;

Fig. 7 is a view of the functional parts of the snap switch with the operating finger out of contact with the switch operating plunger and the switch in closed position;

Fig. 8 is a view similar to Fig. 7 but with the operating finger in contact with the switch operating plunger and the switch in opened position;

Fig. 9 is a view of a modification of an arrangement similar to that of Fig. 2 but having an additional snap switch so placed that it will be opened by the operating finger on the Bourdon tube in the event of a leak of the confined fluid under pressure in the bulb and Bourdon tube;

Fig. 10 is a sectional view of the housing and base for the two snap switches and the Bourdon tube taken on line 10—10 of Fig. 9;

Fig. 11 is a view of the thermostat of my invention with the bulb mounted between metal strips for attachment to a wing skin of an airplane;

Fig. 12 is a cross-sectional view on the line 12—12 of Fig. 11;

Fig. 13 is a cross-sectional view on the line 13—13 of Fig. 11;

Fig. 14 is a sectional side elevation schematically showing my invention mounted on the underside and near the outer end of a wing of an airplane; and Fig. 15 is a schematic electrical wiring diagram showing how the two switches of the modification shown in Fig. 9 are connected in series to control a heater.

Referring particularly to Fig. 1 of the drawings, this specific embodiment of my invention comprises a thermosensitive bulb 1 in the form of an elongated stainless steel tube of relatively rigid construction and a portion responsive to changes in internal pressure in the form of a Bourdon tube 2. The bulb 1 and Bourdon tube 2 are in fluid-pressure communication with one another through small-bore connecting tube 3 which is connected to the interior of Bourdon tube 2 through block 4 to which one end of the Bourdon tube 2 is fixed. As shown in Figs. 3 and 4, one end of small bore tube 3 is inserted within a vertical bore 5 of block 4 and the fixed end 6 of the Bourdon tube is mounted in one side of block 4, as most clearly shown in Fig. 4, with a horizontal bore 7 in block 4 placing the Bourdon tube in communication with vertical bore 6.

As shown in Figs. 2, 3, and 4, block 4 is fixed to a base 8 by screws 9 extending through holes 10 of the block and into base 8. With block 4 fixed to base 8, the free end 11 of the Bourdon tube will move with pressure changes of the fluid confined within bulb 1, connecting tube 3, and Bourdon tube 2 caused by temperature changes of the confined fluid. The free end 11 of the Bourdon tube preferably carries an operating finger 12 which with the free end 11 of the Bourdon tube 2 moves in a plane parallel to the Bourdon tube. It will thus be seen that changes in temperature of bulb 1 will cause changes in internal pressure of the confined fluid which in turn causes a movement of operating finger 12. With an increase of temperature and consequent increase in pressure, Bourdon tube 2 will tend to straighten out and move finger 12 to the right toward plunger 14 as viewed in Figs. 1 and 2; and with a decrease in pressure, it will move in the opposite direction away from plunger 14.

As shown particularly in Figs. 3 and 4, small bore tube 3 may extend to block 4 under base 8 and through a hole 31 in base 8 into vertical bore 5 in block 4. The other end of small bore connecting tube 3 may be joined with the inner end of bulb 1 by means of a sleeve 32 backed against a peripheral depression 33 in bulb 1, and is sealed by welding or brazing indicated at 34. The outer end of bulb 1 is closed and provided with a short length small bore tube 35 used to introduce fluid under pressure, as more particularly described below, and then sealed by flattening followed by soldering or brazing the end. This tube 35 may be affixed within the bulb 1 in the same manner as tube 3.

It is an important feature of my invention that the internal volume, that is the volume of the confined fluid in bulb 1, connecting tube 3 and Bourdon tube 2, remains constant with changes in pressure of the confined fluid. Thus the position or movement of operating finger 12 of Bourdon tube 2 depends on the pressure of the confined fluid and not on a change of volume such as, for example, resulting from the use of a moving piston or a bellows instead of a Bourdon tube, which is sensitive to changes in pressure of the confined fluid without a change of its volume. This is especially important, particularly when the confined fluid is a liquid under pressure, with only a sufficiently small relative volume of gas to prevent liquid lock, because, with substantially all liquid as the confined fluid, the position or movement of finger 12 of the Bourdon tube 2 depends on the highest temperature of any portion of liquid within bulb 1 exerting its pressure correspnding to such highest temperature because the rest of the confined fluid at lower temperature acts as a hydraulic pressure transmitting liquid for the highest pressure developed even in a relatively small portion of bulb 1, and thus the position of finger 12 of Bourdon tube 2 depends on this pressure regardless of the lower temperature of the rest of the liquid. It should be noted that this results from the fact that there is substantially no increase in volume of the confined liquid with the arrangement here described and that the position of finger 12 depends only on the pressure of the confined liquid which in turn is determined by the highest temperature of a small portion of this liquid. Thus it will be seen that bulb 1 then may be extended to an indefinite length, and the whole system responds to the point along this length which is at the highest temperature and accordingly will respond to hot spots along the length of such an extended bulb 1.

When the gas used to prevent liquid lock is solely the vapor of the liquid used, the pressure response of the device requires a heating of a volume of liquid at least substantially as large as the volume of the vapor, and thus it will be seen that the sensitivity with respect to the minimum size of hot spot depends on the vapor volume. Accordingly, the vapor volume should be sufficiently small to correspond to the smallest desired liquid hot spot volume to which the device is to be sensitive and yet enough to prevent liquid lock at the highest temperature to which the device may be subjected. It is a further important discovery in accordance with my invention by the addition to the confined liquid and vapor of such a gas as nitrogen, which does not condense under the conditions of use, the maximum volume of liquid which must be heated to produce the desired pressure in the Bourdon tube can be decreased and thus the liquid hot spot volume sensitivity increased.

Also fixed to base 8 is a snap switch indicated generally at 13. As shown in Figs. 2 and 5, snap switch 13 is of a type which is in a housing that can be mounted in a fixed position on base 8 with respect to operating finger 12 so that the operating plunger 14 of the snap switch 13 is in a fixed relation with respect to operating finger 12 carried by the free end of the Bourdon tube. This switch is mounted to base 8 by two screws 15 which extend through two sleeves 16 down into base 8. Switch 13 is normally closed and may be opened by pushing operating plunger 14 inwardly. With the arrangement shown in Fig. 2 an increase in temperature of bulb 1 causes an increase in the pressure of the confined fluid to move the free end 11 of the Bourdon tube 2 so that operating finger 12 moves toward, contacts and pushes switch operating plunger 14 to cause switch 13 to open so that the heater control circuit, including switch leads 17 and 18, is opened and the heater is turned off. When the temperature of bulb 1 again drops causing a corresponding drop in pressure of the confined fluid, the free end of the Bourdon tube moves in the opposite direction and operating finger 12 moves away and free of switch operating plunger 14 so that switch 13 is again closed and the heater is again turned on.

In this particular embodiment of my invention, the snap switch used is described in Catalog No. 61A of the Micro Switch Division of Minneapolis-Honeywell Regulator Company, particularly on pages 2.41 and other pages there referred to and pages 2.80 and 2.81, under catalog listing as Micro Switch BZ-R. (This particular Micro Switch is a double throw type, but only the normally closed portion thereof is used in the embodiment illustrated. It will be understood that the normally closed switch identified by catalog listing WZ-R is the same as the double throw switch as here used.)

Such a snap switch, with the top side removed, is also shown in Fig. 6 where the switch is generally indicated by 13 having operating plunger 14 in operating relation with operating finger 12. At 19 is the basic switch case molded in high precision of plastic such as Bakelite, having a deep box-type construction insuring the rigidity desirable for accurate repeat performance for long operation over wide temperature ranges. A plastic cover 20 is permanently secured to the plastic case. At 21 is a three bladed contact arm spring of beryllium-copper heat treated to insure long life, the two outside blade springs 59 of which are fixed to brass anchor 22 at 23 (Fig. 8) and the middle blade leaf spring 58 of which is fixed to anchor 22 by screw 24, which also fixes anchor 22 to the switch housing. In the arrangement shown in Fig. 2, lead 17 is electrically connected (by known means not shown) to silver contact 25, and lead 18 is connected to the other end of contact arm 21 through screw 24 so that when silver contact 26 on the free end 56 of contact arm 21 is in contact with contact 25, switch 13 is closed. When switch operating plunger 14 is pushed against leaf spring 58 (Fig. 7) the free end of contact arm 21 snaps from the position shown in Fig. 7 to the position shown in Fig. 8 to open the switch, and when finger 12 again moves back away from plunger 14 so that plunger 14 moves away from leaf spring 58, contact arm 21 snaps back to again make contacts 25 and 26 and close the switch. Since this switch is in the heater control circuit, it thus turns the heater off and on. Contact screw 27 with solder terminal 60 provides an electrical connection to contact 28 provided for use of the switch in the normally open position not used here, but behind screw 27 is a similar contact screw (not shown) which likewise extends through a hole in the plastic case to provide separate electrical connection to contact 25, here alone used so that the switch is used as one which is normally closed. Solder terminal 61 is electrically connected through the switch housing by means (not shown) to screw 24 and contact arm 21. In the plastic case 19 are two mounting holes 29 and 30, through which mounting screws 15 extend to hold switch 13 at a fixed position on base 8 relative to Bourdon tube 2, also fixed on base 8 by way of block 4. It will thus be seen that with contact arm 21 and its operating plunger 14 fixed in switch housing 19 which in turn is fixed to the same base 8 as Bourdon tube 2, a fixed relation is established between operating finger 12 of Bourdon tube 2 and the snap action switch 13 so that when switch 13 is properly set with the proper spacing between operating finger 12 and operating plunger 14 the Bourdon tube will open and close switch 13 with changes in pressure of the confined fluid caused by temperature changes in bulb 1. Hence, it will be apparent that snap switch 13 and Bourdon tube 2 are so mounted that movement of the finger 12 on the free end of the Bourdon tube will open and close switch 13 with temperature changes sensed by bulb 1 causing pressure changes of the confined fluid to actuate Bourdon tube 2 without change of volume of the confined fluid. It is thus an important feature of my invention that the Bourdon tube through its operating finger 12 is arranged to operate a snap acting switch. This arrangement gives the advantages of a snap action switch in combination with the Bourdon tube resulting in a combination therewith of a high sensitivity with respect to relatively small changes of pressure on a confined fluid within the Bourdon tube.

In this arrangement the operating member or plunger of the snap switch is preferably electrically insulated from the switch contacts. For example, in the switch shown in Figs. 6, 7 and 8 operating plunger 14 is electrically insulated from springs 21 by electrical insulation 55 between that of operating plunger 14 which contacts finger 12 and the portion which contacts spring 21.

In more detail the snap switch used with this embodiment of my invention consists essentially of a contact arm or spring 21 mounted so that its free end 56 carrying contact 26 moves between two contacts 25 and 28 which act as stops. The contact arm 21 comprises a middle blade which is a thin leaf spring 58 operatively supported at its fixed end by screw 24 in cantilever fashion, the other end 56 carrying contact 26 being free to move, in combination with two outside blades as adjacent parallel compressed springs 59 attached to the free end of the thin leaf spring 58. The other ends of compressed springs 59 are each pivoted at a point adjacent the thin leaf spring 58 and the parts so arranged that the free end will move with a snap action when pressure is applied to spring 58 adjacent its supported end as by way of operating plunger 14. The free end 56 which is free to move between two stops 25 and 28 spaced apart a short distance, normally is in contact with one of the stops and snaps into contact with the other stop upon application of pressure to a portion of the opposite end. When the pressure is relieved the free end of the leaf spring snaps back into its normal position. One or both stops may be of metal so as to provide electrical connection when contact is made with the free end of the leaf spring.

As pointed out above, thin leaf spring 58 is fixed to and firmly supported by screw 24 on switch housing 19 in cantilever fashion, is operated by plunger 14 which extends through the switch housing and contacts spring 58 near its fixed end. It has its free end attached to two parallel spring strips 59, and the free ends of spring strips 59 are pivoted at a point intermediate the ends of the leaf spring and in or near the same horizontal plane as in notches 23 of anchor 22. The parallel spring strips 59 are in longitudinal compression, thereby putting leaf spring 58 in tension. As shown here, leaf springs 58 and spring strips 59 are formed from on sheet of spring material, so that the free ends are thereby firmly held together. As pointed out above, the free end carries contact 26. The bottom contact or stop 28 is placed above the neutral or dead center position of the contact arm 21 so that when actuating pressure on the leaf spring 58 is removed by removing operating plunger 14 out of its contact therewith the switch returns to its normal closed position with contact 26 closing the electrical circuit with contact 25 as shown in Fig. 7. Contact 25 constitutes an upper stop which limits the upward movement of the contact 26. With the switch in the position shown in Fig. 7 leaf spring 58 is flexed from a straight extended and unstressed position into an upwardly bent position so that the strain therein tends to force the free end downward toward contact 28 but this force is overbalanced by the longitudinal compression in spring strips 59 taken together with their shorter effective radius as compared with the longer effective radius of leaf spring 58 so that contact 26 is therefore forced upwardly against contact 25 where it normaly remains in closed position. However, when an actuating force is applied to leaf spring 58 by operating plunger 14, it is depressed at the point of application of this actuating force until contact 26 suddenly moves downward with a snap action to contact 28 where it remains in open position until the actuating force is relieved by allowing operating plunger to move away from its contact with leaf spring 58 whereupon contact 26 snaps back to contact 25 to again close this switch. This particular switch per se is known in the art and is described in U. S. Patent No. 1,960,020.

In this embodiment the particular switch has about 0.0002 to 0.0003 inch movement differential, that is, the movement of plunger 14 from the operating position (where plunger causes snap action from position of Fig. 7 to that of Fig. 8) to the release position (where plunger 14 on returning away from spring 21 snaps back from position of Fig. 8 to position of Fig. 7). The pretravel of plunger 14 to the operating position is 0.015 inch maximum. Pretravel is the distance plunger 14 moves from its free position to its operating position. (These terms and others relating to this Micro Switch are additionally fully defined in the aforesaid catalog on pages 49.03 through 49.06.) It is to be noted that it is another important feature of my invention to have a switch, the movement differential for the operation of which is small, as for the Micro Switch described above, in order to have a high sensitivity for small changes in pressure of the confined fluid, as for example corresponding to small changes in temperature or to changes in temperature of a small portion of the fluid in bulb 1. Hence, with this combination, in accordance with this aspect of my invention exceedingly high sensitivity can be obtained. This is especially true with the particular kind of confined fluid described below used in combination with the type of snap switch here particularly described.

Other types of snap switches may be used and it will thus be seen that with a snap acting switch thus operatively arranged with respect to the Bourdon tube, a small movement of the Bourdon tube against the operating plunger of the switch will cause a quick substantially larger movement of the switch contacts, known in the electrical art as a snap switch. Hence in accordance with my invention, the Bourdon tube is used to move the operating or actuating member of a snap switch which in turn causes a snap action of an electrical contact of the switch as known in the art of electrical switches. Thus the arrangement in accordance with my invention has substantial advantages over an arrangement in which the Bourdon tube moves the electrical contacts of a switch.

With this arrangement in accordance with my invention in which the Bourdon tube is used to actuate a snap switch instead of to move an electrical contact against and away from another electrical contact to close and open an electrical circuit, the disadvantageous effects of arcing arising from shock or vibration displacement of the Bourdon tube are avoided and in addition the contact with the snap switch effects a mechanical damping of vibration or shock displacement of the Bourdon tube. Moreover, should vibration or shock displacement of the Bourdon tube operate the switch one way or the other, it will be a definite operation which will automatically be quickly corrected. For example, should the Bourdon tube by vibration or shock displacement open switch 13 by moving against plunger 14 when the temperature conditions are just a little below the operating temperature, the free end of the Bourdon tube will simply again return to its normal position with finger 12 free of operating plunger 14 so that switch 13 will have simply been turned off and on again in a definite fashion and without any arcing, and the inertia of the plunger 14 and switch will effect a damping of the movement of the free end of the Bourdon tube. Thus this arrangement, in accordance with my invention, materially minimizes the usual undesirable effects resulting from vibration and shock.

Although for these reasons this thermostat, in accordance with my invention, is materially less vulnerable to shock or vibration, it is still another important feature of the arrangement of my invention shown in both Figs. 2 and 9 that all the moving parts move in planes parallel to the mounting or base plate 8 so that their movement is unaffected by accelerations perpendicular to such planes. Thus with this arrangement my thermostat can be mounted on the plane of a wing of an airplane so that it will be unaffected by accelerations perpendicular to the plane of the wing. As is known in the aircraft art, of course, it is only such accelerations which in flight are large enough to cause any harmful effect. Thus with this arrangement it is possible to eliminate the effect of accelerations encountered during flight.

Preferably the switch 13 and the Bourdon tube 2 will be within a housing 36 having a cover 37 with seal 38 therebetween, the cover being hermetically sealed and held in place by nuts 39; block 4 may also be sealed to base 8 as shown in Figs. 3 and 4 by seal 40 so that housing 36 may be filled with inert gas, such as nitrogen, under pressure so the Bourdon tube is not subject to changes in outside pressure with altitude changes. As will be explained below, however, another feature of my invention renders the thermostat of my invention unaffected by changes in altitude, and, hence the housing 36 (but not the base 8) may be omitted insofar as altitude changes are concerned.

It is an important feature of my invention that the thermostat of my invention may be substantially insensitive to changes in temperature at the Bourdon tube 2 while very sensitive to changes in temperature of bulb 1. This is accomplished by making the internal volume of confined fluid within the Bourdon tube very small compared to the volume in bulb 1 and tube 3. It is thus preferred to have the internal volume of confined fluid in the Bourdon tube less than about one-tenth, for example, about 0.03 to 0.04, of the volume of the confined fluid. This may be done by placing a soft plastic-like material inside the Bourdon tube which occupies space, has a very little volume expansion with temperature and which does not impede the normal movement of the Bourdon tube in response to pressure changes of the confined fluid. This may be done, for example, with a standard Bourdon tube available on the market by filling the inside of the tube with dead soft copper as indicated at 41 on Fig. 5, by pushing a snuggly fitting strip of such copper within the tube to occupy the inside space without any substantial change in the effect of the pressure of the confined fluid on the desired movement of the Bourdon tube. Care must be taken that the fit of the dead soft copper strip is not too tight and that the copper is soft enough so as to not hamper the normal Bourdon tube movement. With this arrangement the bulb may be made of any desired length and with substantially all liquid as the confined fluid a change of temperature of any portion of the length of the bulb will operate the thermostat. Hence, it is thus possible to extend the bulb over a considerable length and the thermostat will respond to the highest temperature throughout the length of the bulb.

As another arrangement for filling the inside of the Bourdon tube without impairing its operation I have discovered that relatively small sections of stainless steel, for example, may be used of such cross section to substantially fill and fit within the Bourdon tube. For example, the interior of a Bourdon tube about 2.4 inches long may be filled with six lengths of stainless steel each about 0.4 of an inch in length. Each section of the stainless steel should fit snugly within the Bourdon tube and be short enough so that the normal functioning of the Bourdon tube in moving with changes of internal pressure will not be impaired.

It is still another feature of my invention that the confined fluid is at a pressure sufficiently high that changes in pressure affecting the outside of the Bourdon tube due to altitude changes will be negligibly small. Another advantage of a high pressure in the Bourdon tube is to decrease the vibration amplitude. For example, a pressure of 675 pounds per square inch may be used at an operating temperature of 165° F. for which a change of 15 p. s. i. is negligibly small. It will be understood that with respect to this feature of my invention the actual pressure used must depend on the particular use, but those skilled in the art will with this teaching be able to select a pressure sufficiently high that any expected pressure change is negligibly small with respect thereto for any system of regulation. Ordinarily, for this purpose the pressure should be above about 200 p. s. i. and preferably above about 500 p. s. i.

Especially for some airplane uses, it is desirable to have the thermostat operate at a somewhat lower temperature when the whole airplane, that is, particularly both the bulb and the Bourdon tube, are at the same elevated temperature below but somewhat near the operating temperature. For example, for controlling the de-icing heaters of an airplane with the thermostat set to operate at 165° F., it is desirable when the airplane is at a desert temperature of 140° F. to have the thermostat automatically operate at such a temperature lower than 165° F. because at a temperature of 140° F. no heating for de-icing would be required and heating under such conditions would be undesirable. It is nevertheless still desirable to have the thermostat operate at 165° F. when in flight in an environment where icing might be a problem. Accordingly, automatic adjustment would be a distinct advantage. In accordance with this aspect of my invention, it has been discovered that this automatic adjustment can be obtained by making the Bourdon tube 2 of such a metal as brass which will expand as its temperature rises to shift finger 12 sufficiently close to the tip of plunger 14 so that the operating temperature will be lowered as the temperature of the Bourdon tube rises. It will be understood that to some extent the expansion of base 8 between block 4 and fastening screws 15 will tend to offset such a movement of the position of finger 12 with respect to the tip of plunger 14, and that the resultant relative expansion of this portion of the base and of the Bourdon tube will have to be sufficient to move finger 12 sufficiently close to the tip of plunger 14 that the switch will be operated at a lower temperature as desired. It will also be understood by those skilled in the art that this can be accomplished by providing the necessary expansion of the Bourdon tube 2 with temperature to obtain the desired adjustment by using a Bourdon tube made of a metal having the desired expansion with temperature. It should also be noted that with the thermostat of my invention such adjustment is possible because the direction of movement of finger 12 when the Bourdon tube expands with increase in temperature is toward operating plunger 14. This effect can, if desired, be avoided by making the Bourdon tube of such metal as Invar or Ni-Stan, which will not expand with rise in temperature, or of a metal which will expand the same effective amount as the base so that the relative position of finger 12 and plunger 14 is not changed. Hence, in accordance with this aspect of my invention it is possible to provide any desired result as here indicated.

It is another important feature in accordance with this particular embodiment of my invention that the confined fluid (in bulb 1, small bore connecting tube 3 and Bourdon tube 2) is a mixture of liquid Freon 22 (mono-chloro-difluoro-methane, $CHClF_2$) and a suitable gas, in this instance nitrogen. In this embodiment of my invention, the weight of the nitrogen used with the mono-chloro-difluoro-methane is about 1% of the weight of the mono-chloro-difluoro-methane. With this confined fluid the device is sensitive to the highest temperature of a very small volume of liquid along the length of bulb 1. All of bulb 1 does not have to be heated to a temperature above 165° F. to cause the thermostat to turn off the heater but only a small portion, for example, about 1.3 inch of its length, where the bulb is 8 inches long having an inside diameter of ⅛ inch and the volume of the bulb is 95 percent of the total volume. Also this mixture of liquid and gas gives a satisfactory slope of the pressure-temperature curve at an operating temperature of 165° F. so that a sufficient movement of the Bourdon tube finger 12 is available for a small change in temperature. Moreover, when this fluid mixture is confined at a pressure of 675 pounds per square inch at 165° F., there will still be enough pressure of this mixture to assure operation of the fail-safe feature even at very low temperatures in accordance with a modification of my invention described below. Nitrogen alone has such a low value of slope at the desired operating temperature of 165° F. that it would not give a desirable sensitivity. Moreover, if such a gas alone is used as the confined fluid, the desirable effects of having liquid present are not obtained. Gas alone may be used for some purposes, however, where the slope of the pressure-temperature curve will give this required sensitivity for the required operation, and the sensitivity to hot spots along the bulb is not desired. Liquid without vapor space, that is, liquid under liquid lock, is unsuitable because an increase in temperature would cause such an increase in pressure as would damage the instrument probably by bursting or deforming the Bourdon tube. The addition of the nitrogen has the effect of lifting the pressure at 165° F. from about 475 p. s. i. to about 675 p. s. i. and the pressure at $-65°$ F. from about 10 p. s. i. to about 230 p. s. i., which is ample to operate the fail-safe feature described below for Fig. 9.

It is desirable to have enough gas such as nitrogen to avoid liquid lock at the maximum overshoot temperature to which the confined volume might be subjected and to raise the pressure at the desired operating temperature above the liquid vapor pressure to the pressure desired to minimize the effect of altitude changes and stiffen the Bourdon tube against vibration. On the other hand, the amount of such gas should be small and not great enough to reduce the hot spot volume sensitivity of the bulb and should not be so large as to cause the confined fluid to tend to respond to the average temperature along the bulb as with gas alone instead of having the desired sensitivity to a small hot spot volume of highest temperature along the bulb. In order to assure the fail-safe operation at such a low temperature as $-65°$ F. in accordance with the modification described below and shown in Fig. 9, the amount of gas added should be at least sufficient to provide a pressure of more than about 50 p. s. i. at $-65°$ F.

Other liquid with proper vapor volume as described above may be used instead of monochloro-difluoro-methane either alone or preferably in combination with other gases such as nitrogen provided the requirements are satisfied for the purposes described above. Of course, to have a liquid present as such, the liquid used must have a critical temperature considerably above the operating temperature. Preferably the liquid used should have a critical temperature not too far above the operating temperature, to take advantage of the steepest portion of the pressure-temperature curve, for example, the critical temperature of Freon 22 is about 215° F. only about 50° F. above the operating temperature of 165° F.

In addition to the particular liquids referred to above, other liquids may be used, including, for example, tetrafluoro - methane—$CF_4$, monochlorotrifluoromethane—$CClF_3$, monochloropentafluoroethane—$CClF_2$—$CF_3$, dichlorodifluoromethane—$CCl_2F_2$, octafluorocyclobutane—$C_4F_8$, dichlorotetrafluoroethane—$CClF_2$—$CClF_2$, dichloromonofluoromethane — $CHCl_2F$, trichlorotrifluoroethane — $CCl_2F$ — $CClF_2$, trichloromonofluoromethane—$CCl_3F$, dichlorohexafluorocyclobutane — $C_4Cl_2F_6$, tetrachlorodifluoroethane—CCl₂F—CCl₂F. Other inert gases include argon, helium, and air where the presence of oxygen is not disadvantageous under conditions of use with respect to the particular liquid used.

A modification of my invention is shown in Figs. 9 and 10 in which a fail-safe feature is added by the introduction or addition of another normally closed Micro Switch the same as Micro Switch 13 mounted on the same base so that its operating plunger is moved to turn the switch off by the Bourdon tube if the confined fluid should leak and the Bourdon tube collapse causing finger 12 to move toward block 4. This additional Micro Switch is shown at 42 having operating plunger 43. This switch 42 is connected in series with switch 13 and is likewise in normally closed position so that when finger 12 is between plungers 14 and 43 and out of contact therewith both switches are closed and the de-icing heater on. Should the confined fluid leak, however, Bourdon tube 2 will collapse and force finger 12 against plunger 43 to snap switch 42 open and shut off the heater. When the heater is thus shut off it will remain off until the unit is repaired. Thus this arrangement provides a fail-safe thermostat.

In this modification all the parts except those modifications needed for the additional Micro Switch 42 are the same as described above and carry the same numbers on Figs 9 and 10. Lead 17 from switch 13 is connected to one terminal of switch 42 from which other terminal extends lead 17a. Snap switch 42 is mounted to base 8 by screws 44. This snap switch 42 is mounted at a lower level than snap switch 13 so its case can extend under the case for switch 13 to allow the proper adjustment between finger 12 and plunger 43.

In connection with this fail-safe modification of my invention it is desirable for aircraft use to have a confined fluid which will have a sufficiently high pressure at such extremely low temperatures at —65° F. to assure operation of the fail-safe feature at such low temperatures. As pointed out above, this feature is provided by the mixture of liquid and gas such as CHClF₂ and nitrogen. The presence of the gas with the liquid provides a cushion effect with respect to the confined fluid should the thermostat be subjected to a temperature considerably higher than the normal operating temperature up to the point of liquid lock. For example, should the device be subjected to a temperature up to about 200° F. the expansion of the confined fluid against the nitrogen gas provides a cushion so the device will not be damaged. Gas alone may be used as the confined fluid for this purpose but would not give the desired sensitivity at the operating temperature, where the thermostat of my invention will operate in response to temperature changes of 2° F.

Figs. 11 to 14 illustrate my invention as applied to the underside of one end a completed wing of an airplane, but it will be understood that such an arrangement may be incorporated in the wing structure at the time of manufacture. In this arrangement, bulb 1 is mounted against the outside of the wing skin by metal strip 45 and an auxiliary metal strip 46 by rivets (not shown) through holes 47. Metal strips 45 and 46 are made of material which is a good conductor of heat, such as a metal like Duralumin (aluminum-copper alloy) or copper, to conduct readily wing skin temperature to sensing bulb 1; that is, so that the wing skin temperature changes are rapidly transmitted to temperature sensing bulb 1. It is preferable that strips 45 and 46 be made of the same metal as the wing skin, that is, for example, of Duralumin. This arrangement makes it possible to have the thermostat measure, or sensitive to, the actual wing skin temperature so as to control the wing skin temperature directly in accordance with a measurement of the temperature of the wing skin itself. The bulb 1 may be for example about 8 inches long and located at what is known to be that portion of the wing which gets the hottest when heat is applied. Tube 3 may, for example, be about 18 inches.

Auxiliary metal strip 46 lies against a longitudinal portion of the under surface of the base metal strip 45 covering the bulb 1. The base metal strip 45 has a groove 48 to seat the connecting tube 3. The portions of metal strips 45 and 46 which covers bulb 1 each having matching semi-cylindrical grooves 49 to house the sensing bulb 1 with the metal of the sensing bulb in heat conducting contact with the metal strips. Auxiliary metal strip 46 may extend only over the connection of the tube 3 with bulb 1 at 50 and from approximately this point to the housing of the Bourdon tube only metal strip 45 carrying groove 48 is used to hold tube 3. Housing 36 with base plate 8 carrying the Bourdon tube and Micro Switch arrangement described above may be mounted within the wing in any suitable manner as by means of screws (not shown) through holes 51. Tube 3 may extend under a portion of the housing 36 and base plate 8 as shown in Fig. 3 to extend upwardly through hole 31 into the bottom of block 4 as described above. The end of metal strip 45 extending to housing 36 and base 8 may be fastened to the base by screws 52. This arrangement as applied to the underside of a wing is illustrated in Fig. 14 with the outline of the wing shown at 52.

Fig. 15 shows a schematic electrical circuit diagram for the modification shown in Figs. 9 and 10. Micro Switches 13 and 42 are shown normally closed in series with heater or heater control element 53, with the circuit having an electrical connection 54 to a source of electrical energy for operating the heater or heater control circuit. From this schematic diagram it will be apparent that either Micro Switch 13 or fail-safe Micro Switch 42 will open the circuit to turn off the heater or heater control element 53. It will be understood that 53 may either be an electrical heater in some applications or in other applications may be a device for controlling some other type of heater as known in the art.

It is a further feature of my invention that I have discovered a method whereby the proper porportions of of liquid Freon 22 and nitrogen gas may be placed within the internal volume of Bourdon tube, communicating tube 3 and bulb 1. Nitrogen gas is first introduced into this internal volume by way of small bore tube 35 up to a pressure of 1,000 p. s. i. The system including the Bourdon tube 2, block 4, small bore tube 3, and bulb 1 is then placed under water to check for leaks, after which the pressure is bled down to a value of 100 p. s. i. This removes substantially all the air from the internal volume. At this pressure of 100 p. s. i. the spacing between operating finger 12 of the Bourdon tube and the operating plunger 43 of fail-safe Micro Switch 42 is set at the operating position of plunger 43 so that should the pressure within the Bourdon tube drop any below 100 p. s. i. Micro Switch 42 will be snapped to open position to return off the heater as described above. The pressure is then bled down to 50 p. s. i. of the nitrogen and a solution of Freon 22 and nitrogen, is added to bring the pressure up to 325 p. s. i. This solution contains as much nitrogen as can be dissolved in the Freon at 325 p. s. i. at 70° F. by repeated shaking and repeated addition of nitrogen up to a pressure of 325 p. s. i. The internal volume then contains the required liquid Freon 22 and nitrogen gas with the percentage of nitrogen gas 1.12 percent of the combined weight of the Freon 22 and nitrogen gas.

With the system thus containing the mixture of liquid Freon 22 and nitrogen gas at 325 p. s. i. at 70° F., it is immersed in water at 165° F. which raises the pressure from 325 to 675 p. s. i. This, of course, moves the finger 12 away from Micro Switch operating plunger 43 to the operating position at this temperature. At this position of the operating finger 12 of the Bourdon tube, switch 13 is set with plunger 14 in contact with finger 12 at the plunger operating position so switch 13 is turned off at this temperature.

Accordingly, it will be seen that my method of filling the confined volume with confined fluid is to add a small amount of the gas under small pressure at room temperature followed by the addition of a saturated solution of the gas in the liquid at the same room temperature, and, at such a pressure at room temperature which, with said gas and said solution in the confined volume, will give the desired pressure at the desired operating temperature. With this procedure only two variables are involved, namely, the pressure of gas first charged to the confined volume and the pressure of the gas and solution at which the confined volume is sealed at room temperature. It is believed, however, that from the teaching here given those skilled in the art will be able to select a combination of these two pressures which will give any desired pressure for any particular operating temperature.

The foregoing description in specific detail of preferred embodiments of my invention and various aspects thereof will suggest to those skilled in the art various changes, substitutions and other modifications of my disclosure that properly lie within the scope of the appended claims.

This application is a continuation-in-part of my copending application Serial No. 300,720, filed July 24, 1952, now abandoned.

I claim:

1. In a thermostat having a temperature sensitive bulb portion and a Bourdon tube operated by pressure changes of a confined fluid within said bulb portion and said Bourdon tube and in which said Bourdon tube operates an electrical switch with changes in pressure of said confined fluid, the improvement in which means is provided within said Bourdon tube for reducing the volume thereof to limit the volume of confined fluid in the Bourdon tube to less than about one-tenth the total volume of the confined fluid whereby the operation of said Bourdon tube is relatively insensitive to changes of temperature of said Bourdon tube and said thermostat is sensitive substantially only to changes in temperature of said bulb portion.

2. In a thermostat as defined in claim 1 in which said means within said Bourdon tube for reducing the volume thereof is dead soft copper.

3. In a thermostat as defined in claim 1 in which said means within said Bourdon tube for reducing the volume thereof comprises a number of sections of stainless steel each of such short length that the operation of the Bourdon tube with changes of internal pressure is not impaired.

4. In a thermostat having a temperature sensitive bulb and a Bourdon tube operated by pressure changes of a confined fluid within said bulb and Bourdon tube and in which said Bourdon tube is operatively associated with an electrical switch to activate the same in response to changes in pressure of said confined fluid, the improvement which comprises the combination in which said switch is normally closed and is opened by movement of said Bourdon tube in response to an increase in pressure of said confined fluid resulting from an increase in temperature in said bulb and includes a second switch in series with said first mentioned switch which second switch is normally closed but is operatively associated with said Bourdon tube to be opened thereby in the event of a leak of said confined fluid from said bulb and Bourdon tube.

5. In a thermostat having a temperature sensitive bulb and a Bourdon tube operated by pressure changes of a confined fluid within said bulb and Bourdon tube caused by temperature changes of said bulb, the combination which comprises a first snap switch normally closed having its operating means in the line of movement of the free end of said Bourdon tube with increase in pressure of said confined fluid resulting from increase in temperature of said bulb so that said Bourdon tube turns said switch off with increase of temperature and on again with subsequent decrease in temperature, a second snap switch in series with said first snap switch and on the opposite side of the free end of said Bourdon tube from said first snap switch, said second snap switch having its operating member in the line of movement of said Bourdon tube on decrease in pressure of said confined fluid so that in the event of leak of said confined fluid said Bourdon tube will open said switch.

6. In a thermostat as defined in claim 5 in which said confined fluid consists of liquid and a sufficient proportion of gas to provide a sufficient pressure at $-65°$ F. to assure operation of said second snap switch by said Bourdon tube in the event of a leak of said confined fluid.

7. In a thermostat as defined in claim 6 in which said confined fluid consists of monochloro difluoro methane and about 1 percent by weight of nitrogen gas.

8. In a thermostat as defined in claim 6 in which said confined fluid consists of a liquid and a small percentage of inert gas.

9. In a thermostat as defined in claim 6 in which said confined fluid consists of monochloro difluoro methane and about 1 percent by weight of argon.

10. In a thermostat as defined in claim 6 in which said confined fluid consists of monochloro difluoro methane and about 1 percent by weight of helium.

11. In a thermostat as defined in claim 6 in which said confined fluid consists of monochloro difluoro methane and about 1 percent by weight of air.

12. A method of charging a temperature sensing device having a bulb communicating with a hollow movable member comprising the steps of introducing a gas into the interior of the bulb and member at a predetermined pressure and then adding a liquid at a pressure greater than said predetermined pressure, said liquid pressure being to said predetermined pressure as the volume of the bulb and member is to the desired volume of said gas.

13. A method as claimed in claim 12 wherein said liquid is saturated with said gas prior to said addition of said liquid.

14. A method of charging a temperature sensing device having a bulb communicating with a hollow movable member comprising the steps of introducing a gas into the interior of the bulb and member at an elevated pressure, bleeding said gas from said bulb and member to lower the same to a predetermined pressure, and then adding a liquid at a pressure greater than said predetermined pressure, said liquid pressure being to said predetermined pressure as the volume of the bulb and member is to the desired volume of said gas.

15. In a thermostat having a temperature sensitive bulb portion and a Bourdon tube operated by pressure changes of a confined fluid within said bulb portion and said Bourdon tube and in which said Bourdon tube operates an electrical switch with changes in pressure of said confined fluid, the improvement which comprises the combination of a snap switch operatively fixed with respect to said Bourdon tube so that said Bourdon tube operates said snap switch in response to pressure changes of said confined fluid, in which said Bourdon tube has a fixed end and a free end carrying an operating finger which moves with changes in pressure of said confined fluid and said snap switch is normally closed and has an operating plunger in the path of movement of and contacting said operating finger on the free end of said Bourdon tube with the relationship between said Bourdon tube and said snap switch being such that with an increase in pressure of said confined fluid said operating finger on the free end of said Bourdon tube moves against said operating plunger to open said switch and with decrease in pressure of said confined fluid the free end of said Bourdon tube moves away from said operating plunger to cause said switch to close.

16. In a control device in which an electrical circuit is opened and closed in response to pressure changes within a Bourdon tube adapted to operate a switch in said electrical circuit in response to such pressure changes, the improvement which comprises the combination of a snap switch operatively fixed with respect to said Bourdon tube so that said Bourdon tube operates said snap switch in response to said pressure changes, said snap switch comprising the combination of a thin leaf spring operatively supported in cantilever fashion at one end thereof with the other end free to move, a pair of stops between which said free ends move, a pair of parallel adjacent springs connected to the free end of said leaf spring, said springs being in longitudinal compression and being pivoted at their opposite ends at a point between the supported and free ends of said leaf spring, said pivot point of said spring strip being in fixed relation with respect to said stops, and an operating plunger for acting on a portion of said leaf spring to cause the free end thereof to move with a snap action, said Bourdon tube carrying on the free end thereof an operating finger adapted to contact and actuate said operating plunger to operate said snap switch in response to said pressure changes.

17. In an indicating device having a Bourdon tube operated by changes in pressure of a confined fluid under pressure, the improvement in which said confined fluid is under a pressure greater than about 200 p. s. i. sufficiently high that changes in ambient pressure on the outside of said Bourdon tube resulting from changes in altitude will have a negligible effect on the operating movement of said Bourdon tube.

18. In an indicating device as defined in claim 17 in which said pressure is greater than about 500 p. s. i.

19. A temperature indicating device having a temperature sensitive bulb portion and a Bourdon tube operated by pressure changes of a confined fluid within said bulb portion and within said Bourdon tube, and in which said confined fluid consists of a combination of liquid which at elevated temperature would be subject to liquid lock and a small proportion of gas so that said Bourdon tube responds to a spot of highest temperature along said bulb and said gas cushions said liquid with respect to said liquid lock.

20. In a thermostat having a temperature sensitive bulb portion and a Bourdon tube operated by pressure changes of a confined fluid within said bulb portion and said Bourdon tube with changes in pressure of said confined fluid, the improvement in which solid means is provided within said Bourdon tube for reducing the volume of the fluid therein to limit the volume of confined fluid in the Bourdon tube to less than about one-tenth the total volume of the confined fluid whereby the operation of said Bourdon tube is relatively insensitive to changes of temperature of said Bourdon tube and said thermostat is sensitive substantially only to changes in temperature of said bulb portion.

21. In a thermostat as defined in claim 20 in which said means within said Bourdon tube for reducing the volume thereof is dead soft copper.

22. In a thermostat as defined in claim 20 in which said means within said Bourdon tube for reducing the volume thereof comprises a number of sections of stainless steel each of such short length that the operation of the Bourdon tube with changes of internal pressure is not impaired.

23. In a device having a Bourdon tube operated by pressure changes of a confined fluid therewithin in which said Bourdon tube has associated therewith means for giving an indication in accordance with increase in pressure of the fluid therewithin and further means associated with said Bourdon tube for giving another indication when the pressure of the fluid therewithin drops substantially in the event of a leak of the fluid therefrom, and in which said confined fluid consists of liquid and a sufficient proportion of gas to provide a sufficient pressure at $-65°$ F. to assure operation of said second mentioned means associated with said Bourdon tube in the event of a leak of said confined fluid.

24. In a device having a Bourdon tube operated by pressure changes of a confined fluid therewithin in which said Bourdon tube is operatively associated with an electrical switch so as to operate said switch with changes in pressure of said fluid within the Bourdon tube, the improvement which comprises the combination with said switch and Bourdon tube of a second switch in series with said first mentioned switch operatively associated with said Bourdon tube to be operated thereby and open the circuit including said first mentioned switch in the event of a leak of said confined fluid from said Bourdon tube.

25. In a thermostat as defined in claim 24 in which said confined fluid consists of liquid and a sufficient proportion of gas to provide a sufficient pressure at $-65°$ F. to assure operation of said second snap switch by said Bourdon tube in the event of a leak of said confined fluid.

26. In an indicating device having a Bourdon tube operated by pressure changes of a confined fluid therewithin and in which said Bourdon tube operates an electrical switch with changes in pressure of said confined fluid, the improvement which comprises the combination of a snap switch operatively fixed with respect to said Bourdon tube so that said Bourdon tube operates said snap switch in response to pressure change of said confined fluid, in which said Bourdon tube has a fixed end and a free end carrying an operating finger which moves with changes in pressure of said confined fluid and said snap switch is normally closed and has an operating plunger in the path of movement of and contacting said operating finger on the free end of said Bourdon tube with the relationship between said Bourdon tube and said snap switch being such that with an increase in pressure of said confined fluid said operating finger on the free end of said Bourdon tube moves against said operating plunger to open said switch and with decrease in pressure of said confined fluid the free end of said Bourdon tube moves away from said operating plunger to cause said switch to close.

References Cited in the file of this patent
UNITED STATES PATENTS

| Number | Name | Date |
|---|---|---|
| 313,523 | Prentiss et al. | Mar. 10, 1885 |
| 1,762,491 | Thommes | June 10, 1930 |
| 1,838,377 | Faber | Dec. 29, 1931 |
| 2,067,959 | Wasson | Jan. 19, 1937 |
| 2,186,984 | McCloy | Jan. 16, 1940 |
| 2,251,129 | Hammond | July 29, 1941 |
| 2,300,895 | Hopkins | Nov. 3, 1942 |
| 2,348,982 | Joyce | May 16, 1944 |
| 2,357,878 | Crew | Sept. 12, 1944 |
| 2,479,616 | Hasselhorn | Aug. 23, 1949 |